United States Patent
Wang et al.

(10) Patent No.: US 11,882,050 B2
(45) Date of Patent: Jan. 23, 2024

(54) METHOD, APPARATUS AND SYSTEM FOR HANDLING AN INTERNET PROTOCOL PACKET

(71) Applicant: Telefonaktiebolaget LM Ericsson (publ), Stockholm (SE)

(72) Inventors: Keven Wang, Sollentuna (SE); Rafia Inam, Västerås (SE); Hongxin Liang, Upplands Väsby (SE); Leonid Mokrushin, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 72 days.

(21) Appl. No.: 16/314,946

(22) PCT Filed: Jul. 4, 2016

(86) PCT No.: PCT/EP2016/065657
§ 371 (c)(1),
(2) Date: Jan. 3, 2019

(87) PCT Pub. No.: WO2018/006926
PCT Pub. Date: Jan. 11, 2018

(65) Prior Publication Data
US 2019/0312819 A1    Oct. 10, 2019

(51) Int. Cl.
*H04L 47/24* (2022.01)
*H04L 47/28* (2022.01)
(Continued)

(52) U.S. Cl.
CPC ............ *H04L 47/31* (2013.01); *H04J 3/0661* (2013.01); *H04L 7/00* (2013.01); *H04L 47/24* (2013.01);
(Continued)

(58) Field of Classification Search
CPC ............ H04L 2212/00; H04L 47/2416; H04L 47/286; H04L 47/31; H04L 47/32
See application file for complete search history.

(56) References Cited

U.S. PATENT DOCUMENTS 9,923,836 B1 * 3/2018 Vivanco ............ H04L 47/2475
2007/0195797 A1   8/2007 Patel et al.
(Continued)

FOREIGN PATENT DOCUMENTS

CN    101193060 A    6/2008
CN    104301214 A    1/2015
(Continued)

OTHER PUBLICATIONS

International Search Report and Written Opinion of the International Searching Authority, PCT/EP2016/065657, dated Jan. 26, 2017, 13 pages.
(Continued)

*Primary Examiner* — Derrick W Ferris
*Assistant Examiner* — M Mostazir Rahman
(74) *Attorney, Agent, or Firm* — Sage Patent Group

(57) ABSTRACT

A method performed in a network node for handling an Internet Protocol, IP, packet. The IP packet originates from a source node and addresses to a destination node in an IP communication network. Upon receipt of the IP packet, the network node decapsulates the IP packet to obtain, from a network layer header of the IP packet, an indication of a point in time to drop the IP packet. The point in time to drop the IP packet is based on a first maximum delay of the IP packet between the source node and the destination node. The first maximum delay was obtained from an application software running on the source node. The network node determines whether or not to drop the IP packet based on the indication, using a clock of the network node synchronized with a clock of the source node.

10 Claims, 7 Drawing Sheets

(51) Int. Cl.
  *H04L 47/31* (2022.01)
  *H04L 47/2416* (2022.01)
  *H04L 47/32* (2022.01)
  *H04J 3/06* (2006.01)
  *H04L 7/00* (2006.01)
  *H04L 47/35* (2022.01)
  *H04L 47/26* (2022.01)

(52) U.S. Cl.
  CPC .......... *H04L 47/2416* (2013.01); *H04L 47/28* (2013.01); *H04L 47/286* (2013.01); *H04L 47/32* (2013.01); *H04L 47/35* (2013.01); *H04L 47/26* (2013.01); *H04L 2212/00* (2013.01)

(56) References Cited

U.S. PATENT DOCUMENTS

| | | | | |
|---|---|---|---|---|
| 2013/0044634 A1* | 2/2013 | Wang | ................ | H04L 12/6418 370/254 |
| 2013/0188644 A1* | 7/2013 | Chen | ................ | H04L 65/1016 370/392 |
| 2013/0297774 A1* | 11/2013 | Pope | ................ | H04L 47/286 709/224 |
| 2014/0098811 A1* | 4/2014 | Bouazizi | ................ | H04L 65/60 370/389 |
| 2014/0150014 A1* | 5/2014 | Aitken | ................ | H04N 21/64322 725/33 |
| 2015/0280874 A1* | 10/2015 | Lim | ................ | H04L 65/65 370/329 |

FOREIGN PATENT DOCUMENTS

| CN | 105657081 A | 6/2016 |
|---|---|---|
| EP | 2001231 A2 | 12/2008 |
| EP | 2661029 A1 | 11/2013 |

OTHER PUBLICATIONS

Office Action dated Jun. 15, 2022 for Chinese Patent Application No. 201680087407.X, 12 pages.

* cited by examiner

METHOD, APPARATUS AND SYSTEM FOR HANDLING AN INTERNET PROTOCOL PACKET

CROSS REFERENCE TO RELATED APPLICATIONS

This application is a 35 U.S.C. § 371 national stage application of PCT International Application No. PCT/EP2016/065657 filed on Jul. 4, 2016, the disclosure and content of which is incorporated by reference herein in its entirety.

TECHNICAL FIELD

Embodiments herein relate to a source node, a network node, a system and methods therein. In particular, they relate to handling an internet protocol packet.

BACKGROUND

The Open Systems Interconnection model (OSI model) is a conceptual model that characterizes and standardizes the communication functions of a telecommunication or computing system without regard to their underlying internal structure and technology. Its goal is the interoperability of diverse communication systems with standard protocols. The model partitions a communication system into abstraction layers. The original version of the model defined seven layers, i.e., application layer, presentation layer, session layer, transport layer, network layer, data link layer and physical layer. A layer serves the layer above it and is served by the layer below it.

Data is transmitted from a source node to a destination node. At the source node, data is created at the application layer, and each subsequent layer builds a protocol data unit (PDU) by encapsulating a header (and sometimes trailer) containing its control information until the data passes down through to the Physical layer. The process of building a protocol data unit at each layer is called encapsulation. At the destination node, the Physical layer receives the data and a reverse process begins. Headers are decapsulated at each subsequent layer as the data passes up through to the application layer. This reverse process is referred to as decapsulation.

Time to live (TTL) is a mechanism that limits the lifespan or lifetime of data in a computer or network. The TTL value can be thought of as an upper bound on the time that an IP packet can exist in a network. The Internet Protocol (IP) works on the Network layer of the OSI model. The purpose of a TTL field in the network layer header is loop detection, i.e. to avoid that an IP packet stays in a network forever when it enters into a loop topology.

In theory, TTL can be measured in seconds. However, in practice, TTL is measured in hops. A hop is a portion of a path between a source node and destination node. Each time a packet is passed to a next device, a hop occurs. One hop is one step from one device, e.g., a router to a next device, e.g. another router. The TTL field is set by the sender, and reduced by every routing node on the path to its destination node. If the TTL reaches zero before the IP packet arrives at its destination, then the IP packet is discarded.

As long as TTL is not zero, the IP packet is forwarded towards the destination node. However, after arriving at the application software running on the destination node, the data may be determined expired, due to the fact that some application softwares require a high bandwidth and a low latency. The high bandwidth may be 10 Gbps throughput. The low latency requirement may be one millisecond. Particularly, the real-time application softwares, e.g. Virtual Reality, 4 k video streaming, online games, etc. have such a requirement. Only those data that arrive at the destination node within a given latency budget are useful. The late arrived data are expired data, and become meaningless for such an application software.

It means that the expired packet is transmitted until the last hop in the network. This not only makes the network unnecessarily congested, but also affects the quality of other concurrently executing real-time application softwares by using the network capacity for the expired packets.

SUMMARY

It is therefore an object of embodiments herein to improve the way of transmitting data in an IP communication network.

According to a first aspect of embodiments herein, the object is achieved by a method performed in a network node for handling an Internet Protocol, IP, packet. The IP packet originates from a source node and addresses to a destination node in an IP communication network. Upon receipt of the IP packet, the network node decapsulates the IP packet to obtain, from a network layer header of the IP packet, an indication of a point in time to drop the IP packet. The point in time to drop the IP packet is based on a first maximum delay of the IP packet between the source node and the destination node. The first maximum delay was obtained from an application software running on the source node. The network node determines whether or not to drop the IP packet based on the indication, using a clock of the network node synchronized with a clock of the source node.

According to a second aspect of embodiments herein, the object is achieved by a network node for handling an Internet Protocol, IP, packet. The IP packet originates from a source node and addresses to a destination node in an IP communication network. The network node is configured to receive the IP packet. The network node is further configured to decapsulate the IP packet to obtain, from a network layer header of the IP packet, an indication of a point in time to drop the IP packet. The point in time to drop the IP packet is based on a first maximum delay of the IP packet between the source node and the destination node. The first maximum delay was obtained from an application software running on the source node. The network node is further configured to determine whether or not to drop the IP packet based on the indication, using a clock of the network node synchronized with a clock of the source node.

According to a third aspect of embodiments herein, the object is achieved by a computer program comprising instructions, which when executed by a network node, cause the network node to perform the method according to the above first aspect.

According to a fourth aspect of embodiments herein, the object is achieved by a carrier comprising the computer program according to the above third aspect.

According to a fifth aspect of embodiments herein, the object is achieved by a method performed in a source node for handling an Internet Protocol, IP, packet. The IP packet originates from a source node and addresses to a destination node in an IP communication network. The source node obtains, from an application software running on the source node, a first maximum delay of the IP packet between the source node and the destination node. The source node determines a point in time to drop the IP packet based on the first maximum delay. The source node encapsulates, at a network layer of the source node, a data payload with a network layer header to generate the IP packet, wherein the network layer header comprises an indication of the point in time to drop the IP packet. The source node transmits the IP packet to a network node operating in the IP communication network.

According to a sixth aspect of embodiments herein, the object is achieved by a source node for handling an Internet Protocol, IP, packet. The IP packet originates from a source node and addresses to a destination node in an IP communication network. The source node is configured to obtain, from an application software running on the source node, a first maximum delay of the IP packet between the source node and the destination node. The source node is further configured to determine a point in time to drop the IP packet based on the first maximum delay. The source node is further configured to encapsulate, at a network layer of the source node, a data payload with a network layer header to generate the IP packet, wherein the network layer header comprises an indication of a point in time to drop the IP packet. The source node is further configured to transmit the IP packet to a network node operating in the IP communication network.

According to a seventh aspect of embodiments herein, the object is achieved by a computer program comprising instructions, which when executed by a source node, cause the source node to perform the method according to the fifth aspect as above.

According to an eighth aspect of embodiments herein, the object is achieved by a carrier comprising the computer program according to the seventh aspect.

According to a ninth aspect of embodiments herein, the object is achieved by a system for handling an Internet Protocol, IP, packet. The IP packet originates from a source node and addresses to a destination node in an IP communication network. The system comprises the source node according to the above sixth aspect, and at least one network node according to the above second aspect.

The carrier mentioned above may be any one of an electronic signal, an optical signal, an electromagnetic signal, a magnetic signal, an electric signal, a radio signal, a microwave signal, or a computer-readable storage medium.

The indication of the point in time to drop the IP packet based on a first maximum delay obtained from the application software running on the source node is introduced. An advantage is that the network node is enabled to determine whether or not to drop an expired IP packet based on the first maximum delay instructed by the application software running on the source node. Furthermore, since an IP packet created by the real-time application software might be dropped by the network node directly before reaching the destination node, the network load is therefore reduced. Another advantage is that the overall available capacity of the network is increased for data stream from other application softwares by dropping expired IP packets. This results in that the way of transmitting data in an IP communication network is improved.

BRIEF DESCRIPTION OF THE DRAWINGS

Examples of embodiments herein are described in more detail with reference to attached drawings in which.

DETAILED DESCRIPTION

As part of developing embodiments herein, a problem will first be identified and shortly discussed.

A conventional routing node can only expire an IP packet based on the TTL field. However, the TTL is used for hop limit in practice. Though the TTL value may be measured in seconds, it is not possible to use it as a precise expiration time. Therefore an expired IP packet with respect to the application software, e.g., real-time application software, cannot be dropped by a routing node. The expired IP packet running on the network may cause a lot of waste on the network resource and may even deteriorate a Quality of Service (QoS) of other traffic. The more low latency requirement traffic, the more network resource waste, the worse QoS.

Embodiments herein relate to a method for handling an IP packet. It is provided by the method to allow an application software to instruct the network layer a point in time to drop IP packet according to the latency requirement of the application software.

The source node 111 encapsulates the IP packet according to the latency requirement from the application software.

As mentioned earlier, the TTL field of IP header is meant to serve a different purpose and uses a different time unit scale from the embodiments, and therefore it cannot meet the latency requirement from application softwares, e.g., real-time application softwares. Thus, in addition to the TTL field, a new field is introduced to carry an indication of the point in time to drop the IP packet.

The method enables a network node, at the network layer, to inspect an IP packet, and determine to drop the expired packet directly and consequently reduce the network load.

Figure 1:
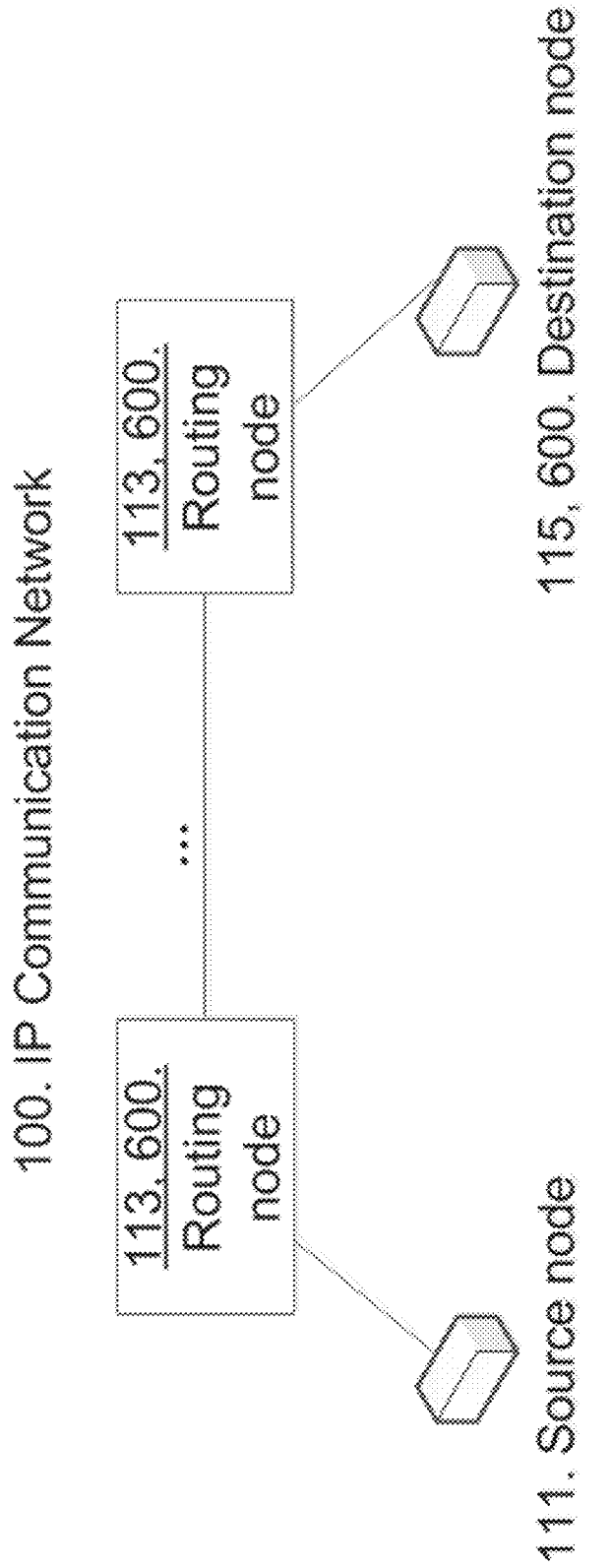
FIG. 1 is a schematic block diagram illustrating an IP communication network.

FIG. 1 depicts an example of an IP communication network 100 in which embodiments herein may be implemented.

A data packet is transmitted in the communications network 100 along a path comprising a source node 111, a destination node 115 and optionally at least one routing node 113, as depicted in FIG. 1. A method according to embodiments herein is performed in the source node 111. Another method according to embodiments herein may be performed by any one of the routing node 113 and the destination node 115. Therefore the wording network node 600 is introduced to comprise the routing node 113 and/or the destination node 115. This method is thus performed by the network node 600.

The source node 111 and the destination node 115 may be any communication entities in either wired or wireless form. Examples of the the source node 111 and the destination node 115 may be: a User Equipment, a mobile terminal, a wireless terminal, a mobile stations, a mobile phone, a camera equipped with a communication module, a computer, a tablet computer, a pad, a set-top box (STB), a Personal Digital Assistant (PDA), a cellular telephone, a web appliance, a Machine to machine (M2M) device, a vehicle equipped with a communication module, a sensor equipped with communication module deployed in a network and a machinery in a manufactory equipped with a communication module, etc.

The routing node 113 may be any network device in virtual or physical form having a routing module or a routing function, e.g., including a router, layer-3 switch, router, a firewall, a gateway, or having a network function working on layer 3 and above. To simplify the figure, only two routing nodes 113 are presented, while in practice, there may be any number of the routing node 113 along the path.

Figure 2:
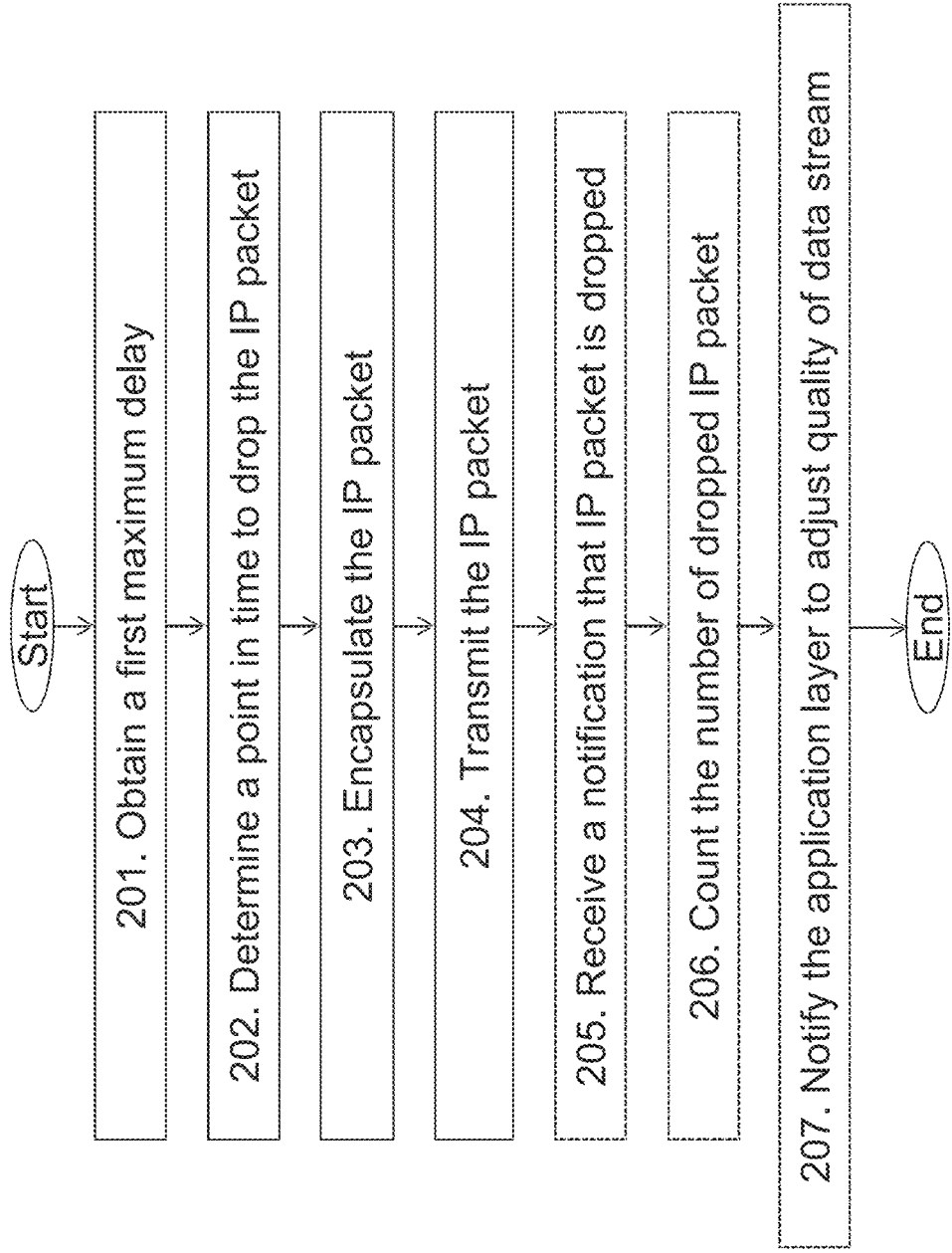
FIG. 2 is a flowchart depicting embodiments of a method in a source node.
Figure 4A:
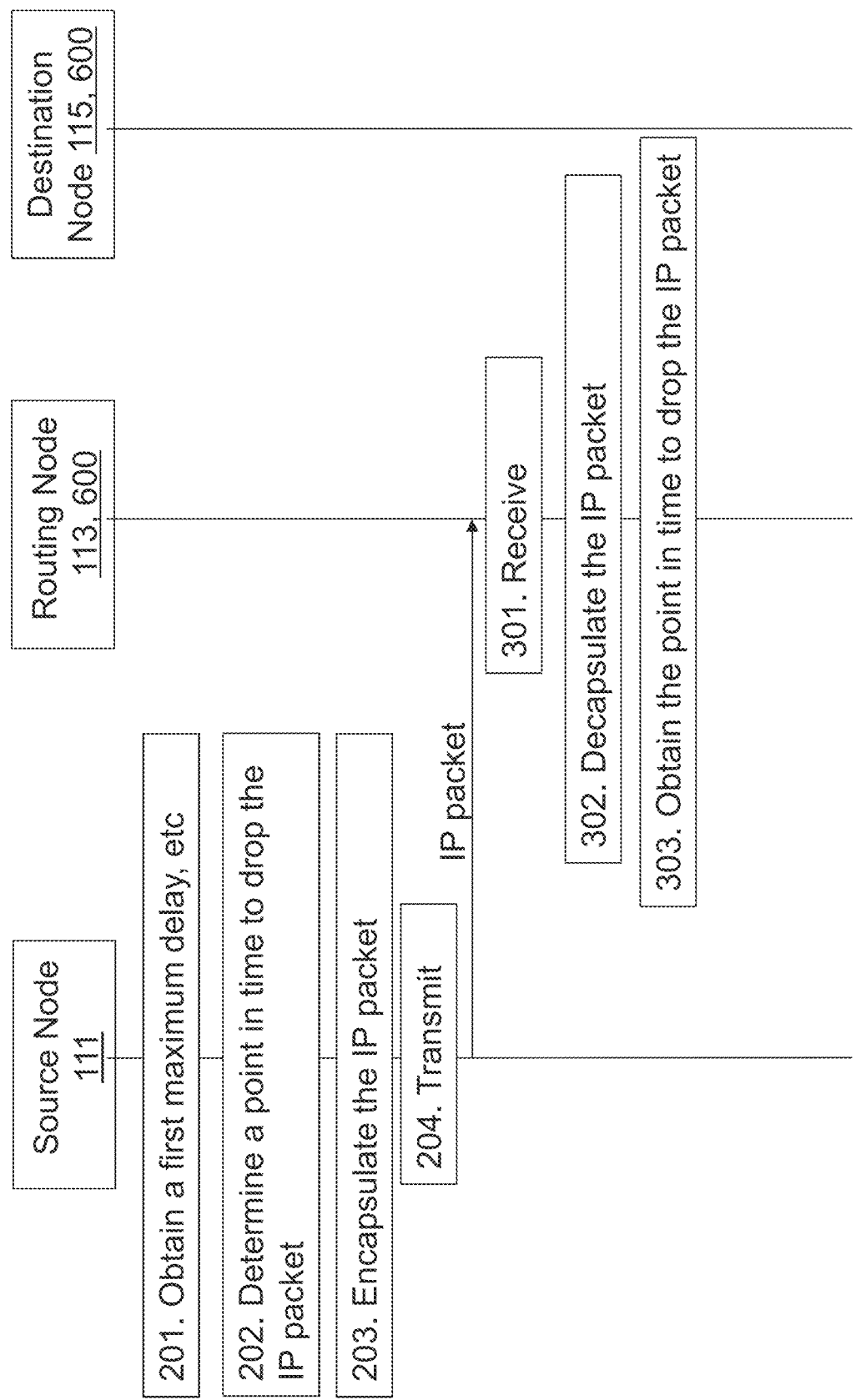
FIG. 4A is a signaling depicting embodiments of a method in a source node and a network node.
Figure 4B:
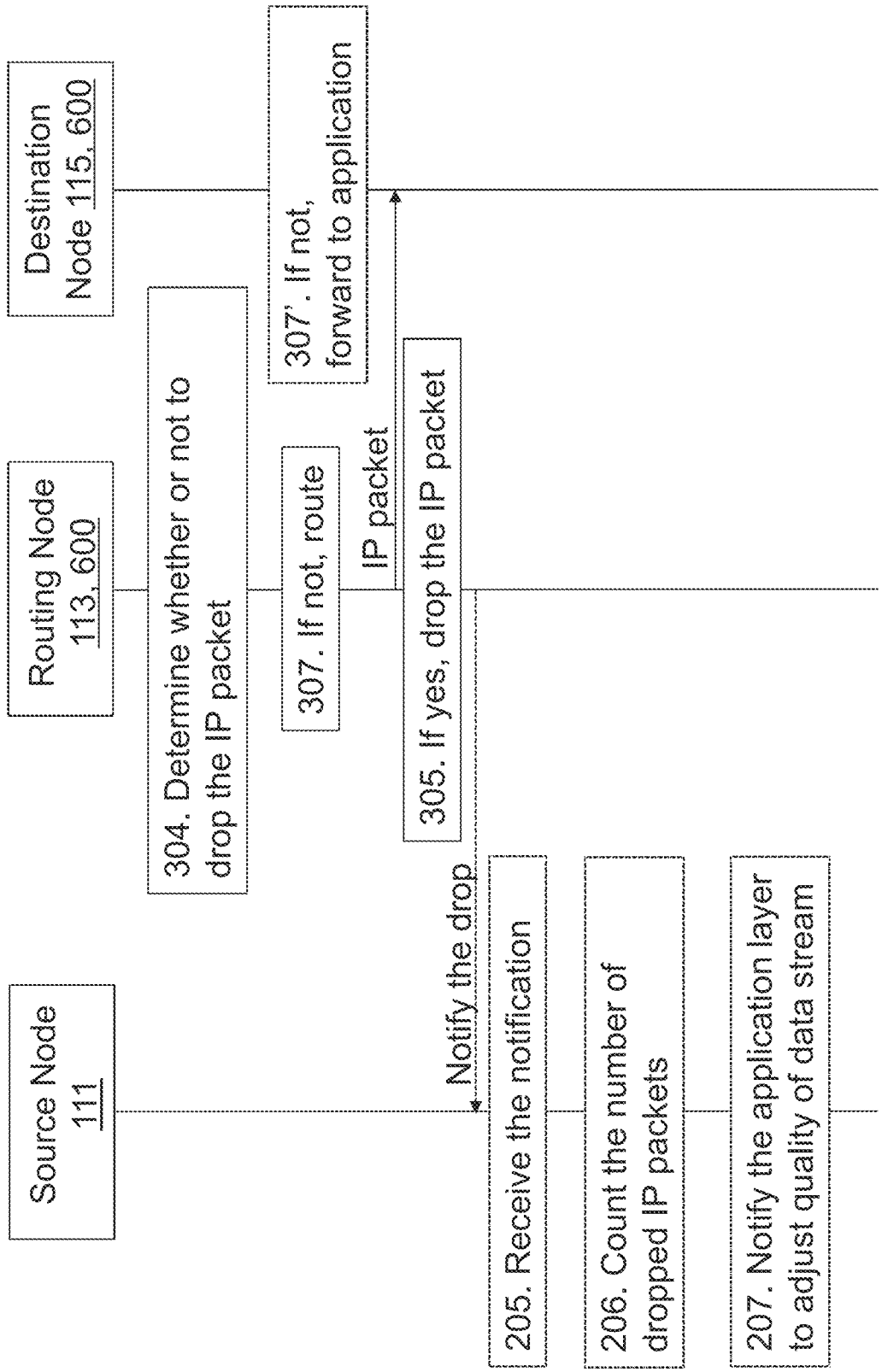
FIG. 4B is a signaling depicting embodiments of a method in a source node and a network node.

Example of embodiments of a method performed by the source node 111 for handling an IP packet will now be described with reference to FIG. 2 together with FIGS. 4A-4B. The IP packet originates from the source node 111 and addresses to a destination node 115 in an IP communication network 100.

The method may comprise one or more of the following actions, which actions may be performed in any suitable order.

Action 201

In order to take into account the latency requirement of the application software, the source node 111 obtains from an application software installed on the source node 111, a first maximum delay of the IP packet between the source node 111 and the destination node 115.

As an implementation form, the source node 111 may obtain the first maximum delay from an application software, which may be working at the application layer, but may also be working at multiple layers including the application layer, presentation layer, session layer and transport layer.

The first maximum delay is a latency requirement required by the application software, indicating how long the data may travel over the network before it expires and can be dropped.

Optionally, the first maximum delay is in submillisecond scale. Thanks to the submillisecond scale, a precise first maximum delay required by the application software is obtained.

By only obtaining the first maximum delay, instead of obtaining an absolute time, from application software, a delay, which may be significant sometimes, between computing the absolute time by an application software and the point in time when the IP packet is actually transmitted by the source node 111 is avoided. Therefore, a more precise result is achieved.

According to some embodiments, a timestamp when the data originated at the application software may also be obtained in order to achieve a more accurate result, which will be explained in further details below.

Action 202

To introduce the latency requirement of the application software to a network layer header of the IP packet, a point in time to drop the IP packet which will be indicated in the network layer header needs to be determined. The source node 111 determines the point in time to drop the IP packet based on the first maximum delay.

The point in time to drop the IP packet is related to a sum of a first timestamp and a maximum delay, referred to as a second maximum delay herein to distinguish from the first maximum delay.

The first timestamp relates to a point in time when the IP packet will be transmitted by the source node 111 to a next hop such as the routing node 113 or if only one hop, to the destination node 115. In other words, the first timestamp is a point in time when the IP packet will leave the source node 111. The first timestamp is estimated, since this action is performed before the transmitting of the IP packet.

According to some embodiments, the second maximum delay is determined based on the first maximum delay and is not longer than the first maximum delay. Sometimes the first maximum delay is directly used as the second maximum delay, in which case the first maximum delay is equal to the second maximum delay. Sometimes, a delay within the source node, e.g., caused by the encapsulation of the IP packet, may be taken into account, in such a case the second maximum delay is determined by reducing the first maximum delay by the delay within the source node 111. Similarly a delay within the destination node 115, e.g., caused by the decapsulation of the IP packet, may also be taken into account.

Optionally, the point in time to drop the IP packet is in submillisecond scale. By doing this, accuracy down to submilliseconds is achieved, a precise latency requirement from the application software is fulfilled.

Action 203

After determining the point in time to drop the IP packet, the source node 111 encapsulates, at a network layer of the source node 111, a data payload with a network layer header to generate the IP packet. The network layer header comprises the indication of the point in time to drop the IP packet.

According to some embodiments, the indication may e.g. be in a form of:

form 1: the first timestamp in together with the second maximum delay;

form 2: an absolute time, which is a sum of the first timestamp and the second maximum delay.

According to some embodiments, the indication is carried in an Option field of the network layer header.

By using the Options field to carry the indication, an advantage is that the embodiments are compliant to the conventional routing nodes. Since the conventional routing nodes which do not implement the provided embodiments are not impacted by the present method.

Action 204

The source node 111 transmits the IP packet to the network node 600, 113, 115 operating in the IP communication network 100, which is a next hop along the path.

Optional, to further improve the handling of IP packet for the future data transmission, Actions 205-207 may be performed based on a feedback of the transmission of the current IP packet, particularly when the IP packet is dropped due to latency.

Action 205

The source node 111 receives a notification from the network node 600 when the IP packet is dropped.

Action 206

The source node 111 then counts the number of dropped IP packets based on the notification.

As an implementation form, the source node 111 may count the number of dropped IP packets in a sliding time window. This may also be referred to counting a rate of IP packet drops.

Action 207

The source node 111 may then notify the application software installed on the source node 111 to adjust a quality of data stream based on the number of dropped IP packets.

Assuming the source node 111 starts by producing a high quality stream with a high bit-rate and high frame-rate. When lots of packets are dropped due to latency, the source node 111 may adjust the quality of data stream by producing a lower quality stream with the lower bit- and frame-rates.

When the IP communication network 100 condition improves, the rate of IP packet drops goes down, the source node 111 may adjust the quality of data stream by increasing the quality of data stream.

To avoid that data cannot arrive the destination node 115 due to it is dropped by the network node 600 when the IP communication network 100 is congested, the source node 111 may simultaneously send multiple streams to the same destination node 115. The multiple streams are of the same content but each with different stream quality, like standard quality stream which has a latency requirement, lower bit-rate and lower frame-rate, high quality stream which has lower latency requirement, high bit-rate and high frame-rate. Therefore, when the communications network 100 is congested and high rate of the high quality stream packets are dropped, the standard quality stream can still get through the network within the specified timing requirements.

The Second Maximum Delay

Functions are provided to clearly show about how the second maximum delay is determined as mentioned in above action 202. The second maximum delay may be determined based on the first maximum delay by any one of functions below:

the second maximum delay=the first maximum delay;  Function 1 the second maximum delay=the first maximum delay−delays within at least one of the source node 111 and destination node 115  Function 2

Delay Within the Source Node 111

With respect to Function 2, the delay within the source node 111 may comprise a delay from the application software to the network layer. In such a case, a timestamp when the data originated at the application software may also be obtained in action 201, to distinguish from the first timestamp, herein referred to as second timestamp. The delay within the source node 111 may be calculated by reducing the first timestamp by the second timestamp.

Delay within the Destination Node 115

According to some embodiments, the source node 111 may receive the delay within the destination node 115 from the destination node 115. Alternatively, the delay within the source node may be used as the delay within the destination node 115, which is based on an assumption that at the destination node 115, the packet will be delayed roughly the same time as that at the source node 111.

Possible Forms of the Indication

In form 1, the indication of the point in time to drop the IP Packet may comprise two fields, i.e., a timestamp field and a maximum delay field, carrying the first timestamp and the second maximum delay, respectively. For instance, each field occupies 32 bits or 64 bits.

In form 2, the indication of the point in time to drop the IP Packet may comprise one field, i.e., timestamp field, carrying only the absolute time. This timestamp field may occupy 64 bits, carrying the absolute time in nanoseconds based on the Coordinated Universal Time (UTC), i.e., after the midnight UTC of the same day, or based on Unix time which is also known as POSIX time or Epoch time.

The indication may further comprise any one of the following fields as shown in Table 1 below.

TABLE 1

| Field | Size (bits) | Description |
| --- | --- | --- |
| Copied | 1 | Whether or not the options need to be copied into all fragments of a fragmented packet. |
| Class | 2 | A general options category. E.g., 0 is for "control" options, and 2 is for "debugging and measurement". 1, and 3 are reserved. |
| Number | 5 | Specifies a form of the Indication. E.g., 0 is for form 1, and 2 is form 1 |
| Length | 8 | Indicates the size of the entire indication (including this field). Optional field, this field may not exist for simple options. |

As an example, the size of each field is provided, however it may be in any length as long as it can carry the information as mentioned in "Description" column of the above Table 1.

As mentioned above the method according to embodiments herein may be performed by any one of the routing node 113 and the destination node 115. Therefore the wording network node 600 is introduced to comprise the routing node 113 and/or the destination node 115. This method is thus performed by the network node 600.

Figure 3:
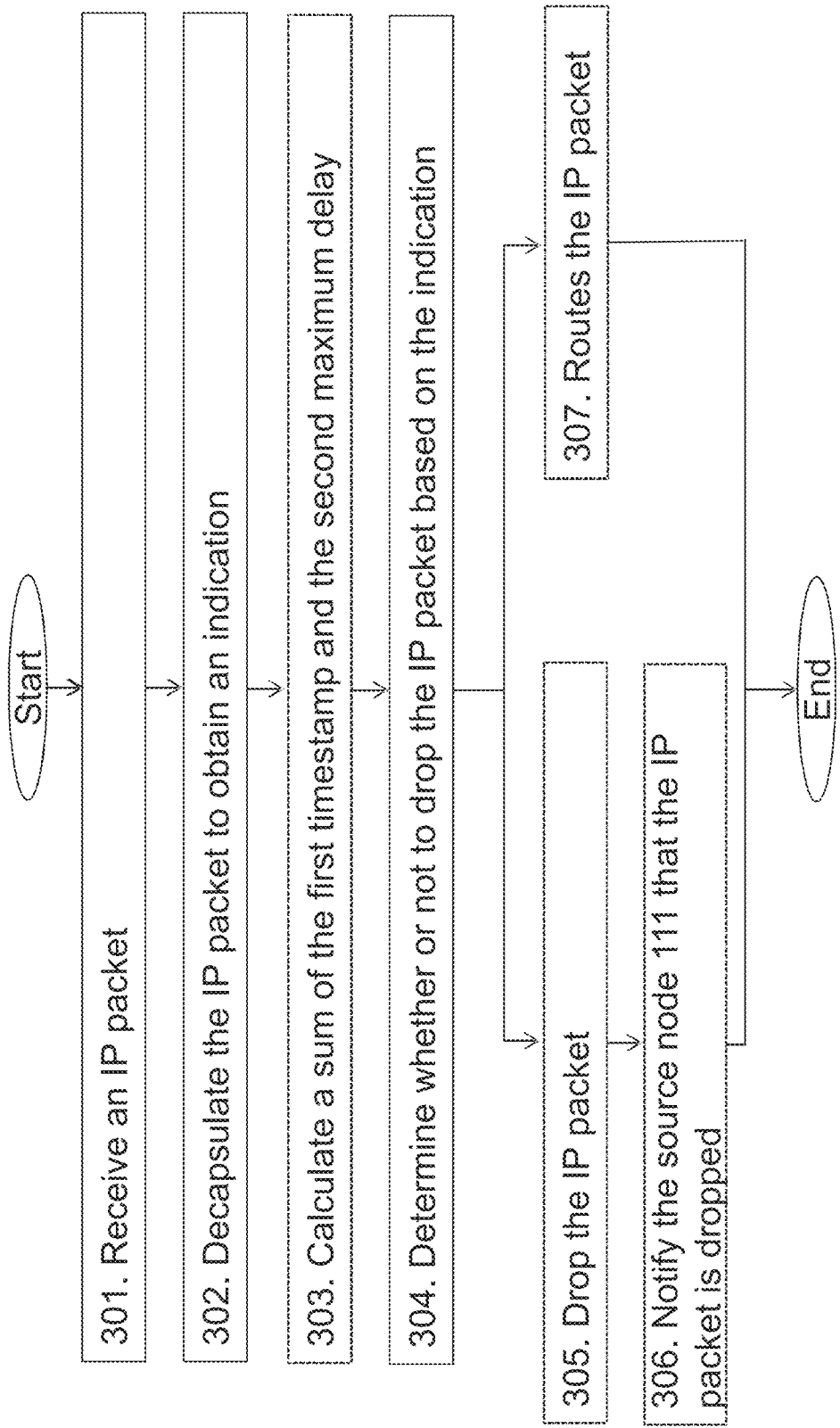
FIG. 3 is a flowchart depicting embodiments of a method in a network node.

Example of embodiments of a method performed by the network node 600 for handling the IP packet will now be described with reference to FIG. 3 together with FIGS. 4A-4B. In FIGS. 4A-4B, the network node 600 refers to the intermediate routing node 113 along the path, however the network node may also refer to the destination node 115. The IP packet originates from the source node 111 and addresses to the destination node 115 in an IP communication network 100.

The method may comprise one or more of the following actions, which actions may be taken in any suitable order.

Action 301

The IP packet is transmitted by the source node 111 along the path towards the destination node 115. The network node 600 receives the IP packet, from an upstream node along the path, which may be the source node 111 with respect to the routing node 113 next to the source node 111, or another routing node with respect to the routing node 113 next to the destination node 115, as shown in FIG. 1.

As mentioned above, the network node 600 may be either the intermediate routing node 113 along the path, or the destination node 115 at the end of the path.

Action 302

The network node 600 decapsulates the IP packet to obtain, from a network layer header of the IP packet, the indication of the point in time to drop the IP packet, which was encapsulated by the source node 111 in Action 203. This decapsulation is performed at the network layer.

At network layer, the network node 600 inspects the IP packet, particularly the indication of the point in time to drop the IP packet. By doing this, the network node 600 is enabled to drop expired packets at an earlier stage and consequently reduce the network load.

Action 303

To obtain the point in time to drop the IP packet based on the indication, the network node 600 calculates a sum of the first timestamp and the second maximum delay, when the indication is in form 1.

When the indication is in form 2, the network node 600 does not perform the calculation, since it may directly compare the point in time when the IP packet was received by the network node 600 with the absolute time.

Action 304

After knowing the point in time to drop the IP packet, the network node 600 compares a point in time when the IP packet was received with the indication of the point in time to drop the IP packet. At the network layer, the network node 600 determines whether or not to drop the IP packet based on the indication, using a clock of the network node 600 synchronized with a clock of the source node 111. By doing this, the network node 600, is enabled to whether or not to drop the IP packet in the course of transmission.

An expired IP packet in the sense of the application software may be determined to be dropped directly by the network node 600. For instance, the network node 600 determines to drop the IP packet in case a point in time when the IP packet was received by the network node 600 is later than the point in time indicated by the indication. A simple way of determining is therefore provided.

An unexpired IP packet in the sense of the application software may be determined to be not dropped, but to be forwarded. For example, the network node 600 determines to not drop the IP packet in case the point in time when the IP packet was received by the network node 600 is no later than the point in time indicated by the indication. A simple way of determining is thus provided.

In order to have the same clock running in the IP communication network 100, the clock of the network node 600 and that of the source node 111 are synchronized. The clock synchronization may be done in any order prior to action 304. Due to that some embodiments are in submillisecond scale, an acurate clock may also be synchronized in submillisecond scale. As a way of clock synchronization, the network node 600 and the source node 111 may be equipped with either a Global Positioning System (GPS) or a Precise Positioning Service (PPS). The network node 600 may either be equipped with a GPS or a PPS to act as a stratum 1 Network Time Protocol (NTP) server or be connected with a stratum 1 NTP server via e.g., a stable and low latency network connection. In this case it is possible to synchronize the clock of the network node 600 and/or the source node 111 down to submillisecond level, which gives enough precision.

Action 305

Optionally, when the IP packet is determined to be dropped, the network node 600 drops the IP packet. By doing this, the network node 600, which is at network layer, can drop such an expired IP packet in the sense of the application software. Since such an IP packet can be dropped in the course of the transmission, the network load is reduced.

Action 306

The network node 600 may as a feedback notify the source node 111 that the IP packet has been dropped, in order to help the sources node 111 improve further data transmission.

An advantage of giving an early feedback about expired and dropped packets to the source node 111, is that the application software installed on the source node 111 can timely reconfigure data streams and/or latency requirement, therefore a better pass rate of the IP packet is achieved.

As an implementation form, the network node 600 may send an Internet Control Message Protocol (ICMP) message, e.g., "Time Exceeded", to notify the source node 111 of the IP packet drop. The other routing nodes along the path forwards the ICMP message.

The "Time Exceeded" message may also be sent by the destination node 115 if it fails to reassemble a fragmented datagram related to the IP packet within a time limit. The "Time Exceeded" message may be used by a traceroute utility to identify gateways on the path between the source node 111 and the destination node 115.

Action 307

Optionally, when the IP packet is determined to be not dropped, in case the network node is the routing node 113, the network node 600 routes the IP packet to a next hop along the path towards the destination node 115. In case the network node is the destination node 115, the network node 600 forwards the IP packet to a corresponding application software installed on the destination node 115 instead of the next hop.

Figure 5:
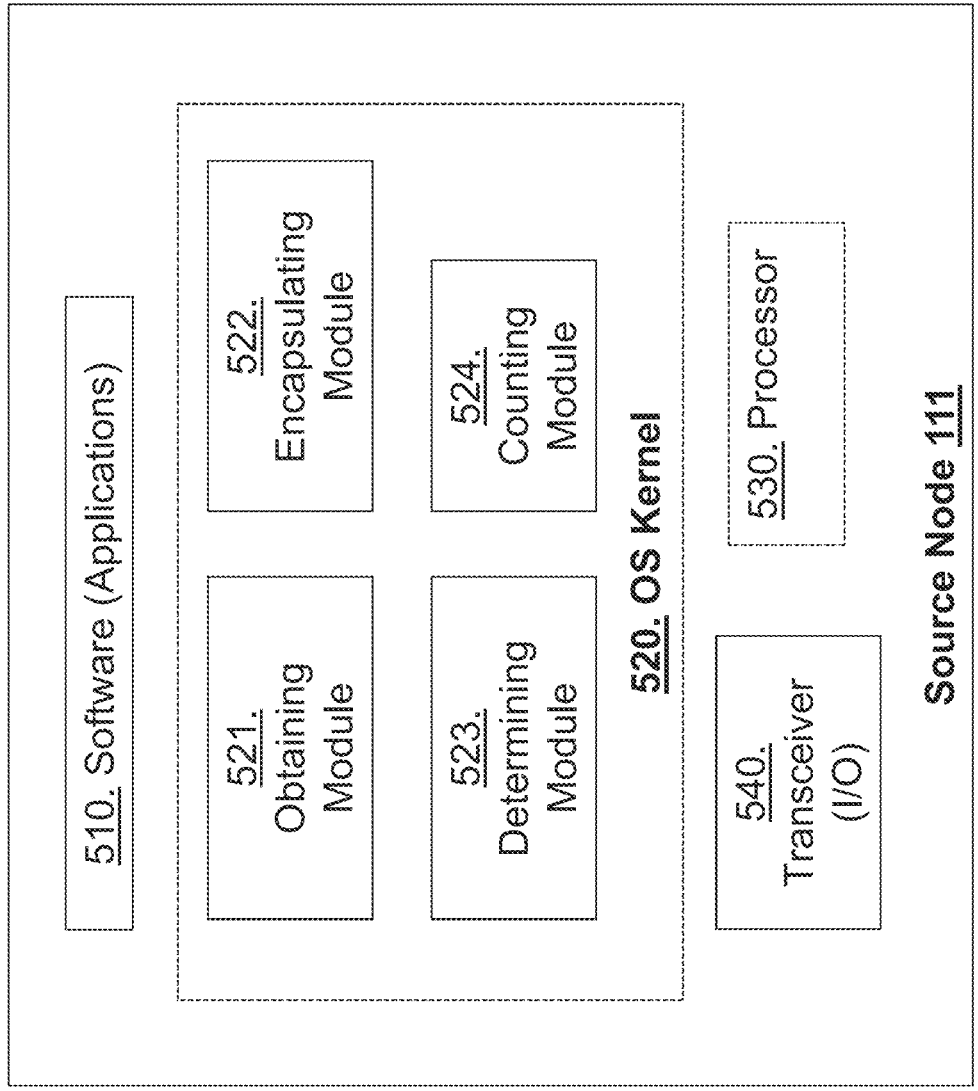
FIG. 5 is a schematic block diagram illustrating embodiments of a source node.

To perform the method actions for handling an IP packet originating from a source node 111 and addressing to a destination node 115 in an IP communication network 100, the source node 111 may comprise the following arrangement depicted in FIG. 5.

The source node 111 is configured, e.g. by an obtaining module 521, to obtain, from an application software installed on the source node 111, the first maximum delay of the IP packet between the source node 111 and the destination node 115. According to an implementation form, the obtaining module 521 obtains the the first maximum delay from an application logic.

The application software 510 installed on the source node 111 decides on the first maximum delay. The application software 510 generates the data stream and sends an instruction to the OS kernel 520 to append the indication of the point in time to drop the IP packet to every packet.

The source node 111 is also configured, e.g. by a determining module 523, to determine the point in time to drop the IP packet based on the first maximum delay.

The source node 111 is also configured, e.g. by a encapsulating module 522, to encapsulate, at a network layer of the source node 111, a data payload with a network layer header to generate the IP packet, where the network layer header comprises the indication of the point in time to drop the IP packet.

The source node 111 is configured, e.g. by a transceiver 540, to transmit the IP packet to a network node 600 operating in the IP communication network 100. As an implementation form, the transceiver 540 is a network interface controller (NIC).

According to some embodiments, the first timestamp relates to the point in time when the IP packet was transmitted by the transceiver 540, e.g., the NIC of the source node 111.

According to some embodiments, the source node 111 is further configured, e.g. by the determining module 523, to determine the point in time to drop the IP packet based on the first maximum delay by any of the above functions.

According to some embodiments, the source node 111 is further configured, e.g. by the transceiver 540, to receive a notification from the network node 600 when the IP packet is dropped; e.g. by a counting module 524, to count the number of dropped IP packets based on the notification; and e.g. by the transceiver 540, to notify the application software 510 installed on the source node 111 to adjust the quality of data stream based on the number of dropped IP packets.

The seven layers of OSI function are provided by a combination of an application software, an operating system (OS) kernel and hardware. The hardware may comprise a central processing unit (CPU), a memory and a input/output (I/O) means that enables data input/output. The CPU is arranged to run or execute computer programs. The memory is arranged to store program instructions and data.

An OS kernel is a computer program, arranged to connect the application software to the hardware. The OS kernel is the first program loaded on startup, is arranged to manage the remainder of the startup, as well as input/output requests from application software, translate them into data processing instructions for the CPU. The OS kernel is also arranged to manage memory, and to manage and communicate with the I/O means. The network layer is normally provided as part of operating system (OS) kernel.

According to some embodiments, as shown in FIG. 5, the obtaining module 521, and the encapsulating module 522, the determining module 523 and the counting module 524 may also be referred as an operating system (OS) kernel 520. The transceiver 540 may be referred as input/output (I/O) means 540. The source node 111 may further comprise a processor 530 configured to assist the performing of the above method for handling the IP packet. The source node 111 may further comprise a memory arranged to store program instructions and data.

According to another embodiment, a computer program comprising instructions, which when executed by the source node 111, cause the source node 111 to perform any of the Actions 201-204 and 206-207.

According to another embodiment, a carrier comprising the computer programs, the carrier is one of an electronic signal, an optical signal, an electromagnetic signal, a magnetic signal, an electric signal, a radio signal, a microwave signal, or a computer-readable storage medium.

Figure 6:
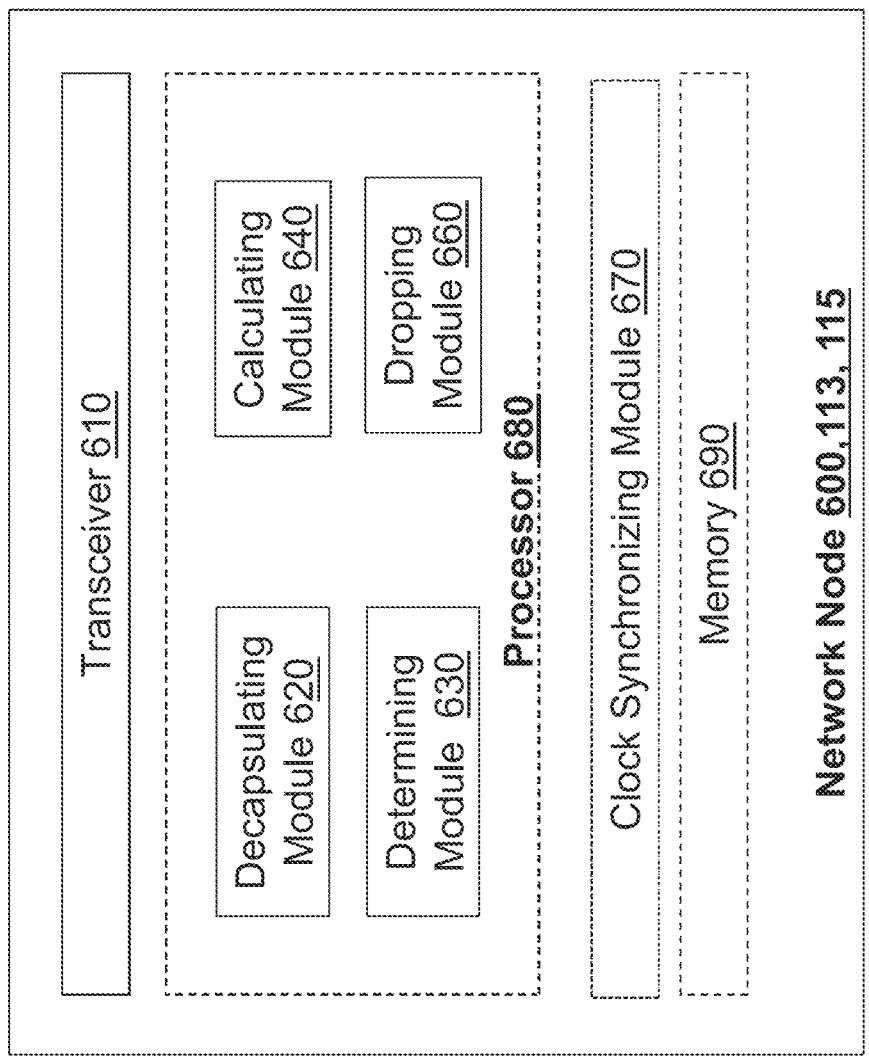
FIG. 6 is a schematic block diagram illustrating embodiments of a network node.

To perform the method actions for handling an IP packet originating from a source node 111 and addressing to a destination node 115 in an IP communication network 100, the network node 600 may comprise the following arrangement depicted in FIG. 6.

The network node 600 is configured, e.g. by means of an transceiver 610, to receive the IP packet.

The network node 600 is further configured, e.g. by means of a decapsulating module 620, to decapsulate the IP packet to obtain, from a network layer header of the IP packet, the indication of the point in time to drop the IP packet. The indication of the point in time to drop the IP packet was encapsulated by the source node 111. The point in time to drop the IP packet is based on the first maximum delay of the IP packet between the source node 111 and the destination node 115. The first maximum delay was obtained from an application software running on the source node 111.

The network node 600 is further configured, e.g. by means of a determining module 630, to determine whether or not to drop the IP packet based on the indication, using a clock of the network node 600 synchronized with a clock of the source node 111, by e.g., comparing a point in time when the IP packet was received with the indication of the point in time to drop the IP packet.

Optionally, when the indication is in form 1, the network node 600 is further configured, e.g. by means of a calculating module 640, to calculate a sum of the first timestamp and the second maximum delay, in order to know the point in time to drop the IP packet.

Optionally, the network node 600 is further configured, e.g. by means of the determining module 630, to determine to drop the IP packet when a point in time when the IP packet was received by the network node 600 is later than the point in time indicated by the indication. In this case, the network node 600 may be further configured, e.g. by means of the dropping module 660, to drop the IP packet. The network node 600 may be further configured, e.g. by means of the transceiver 610, to notify the source node 111 that the IP packet has been dropped, by e.g., sending an ICMP "Time Exceeded" message.

Optionally, the network node 600 is further configured, e.g. by means of the determining module 630, to determine not to drop the IP packet when the point in time when the IP packet was received by the network node 600 is no later than the point in time indicated by the indication. In case the network node 600 is the routing node 113, the network node 600 is further configured, e.g. by means of the transceiver 610, to route the IP packet to a next hop along the path towards the destination node 115. In case the network node is the destination node 115, the network node 600 is further configured, e.g. by means of the decapsulating module 620, to forwards the IP packet to a corresponding application software installed on the destination node 115.

Optionally, the network node 600 is further configured, e.g. by means of a clock synchronizing module 670, to synchronize the clock of the network node 600 with that of the source node 111. As an implementation form, the clock synchronizing module 670 is a GPS or a PPS.

According to another embodiment, the modules 620-660 are implemented as a processor 680. The network node 600 comprises the processor 680 to perform any of the Actions 302-304, in together with the transceiver 610, a memory 690 and optionally the clock synchronizing module 670. The memory 690 is arranged to be used to store e.g. data, configurations, and applications to perform any of the Actions 302-304.

According to another embodiment, the modules 620-670 may also be referred as an operating system (OS) kernel. The transceiver 610 may be referred as input/output (I/O) means. In this case, the network node 600 may further comprise a processor configured to assist the performing of the above method for handling the IP packet. The network node 600 may further comprise a memory arranged to be used to store e.g. data, configurations, and applications to perform any of the Actions 302-307.

According to another embodiment, a computer program comprising instructions, which when executed by the network node 600, cause the network node 600 to perform any of the Actions 302-307.

According to another embodiment, a carrier comprising the computer programs, the carrier is one of an electronic signal, an optical signal, an electromagnetic signal, a magnetic signal, an electric signal, a radio signal, a microwave signal, or a computer-readable storage medium.

According to another embodiment, a system for handling an Internet Protocol, IP, packet originating from a source node 111 and addressing to a destination node 115 in an IP communication network 100 is provided. The system comprises the source node 111 according to FIG. 5, and at least one network node 600, 115, 113 according to FIG. 6. In case, the system comprises only one network node, the only one network node is the destination node 115. In case there is more than one network node, one network node is the destination node 115, and the remaining network node(s) are the intermediate routing nodes 113.

Those skilled in the art will appreciate that the embodiments apply to all kinds of IP communication network 100, including IPv4, IPv6 etc.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed in a source node for handling an Internet Protocol (IP) packet originating from the source node and addressing to a destination node in an IP communication network, the method comprising:
obtaining, from an application software installed on the source node, a first maximum delay of the IP packet between the source node and the destination node;
determining a second maximum delay based on a difference between the first maximum delay and at least one of an amount of a delay that will be caused by performing encapsulation of a data payload with a network layer header of the IP packet by the source node and an amount of a delay that will be caused by performing decapsulation of the data payload with the network layer header of the IP packet by a destination node addressed by the IP packet;
determining a time to drop the IP packet based on the second maximum delay;
encapsulating, at a network layer of the source node, the data payload with the network layer header to generate the IP packet, wherein the network layer header comprises an indication of the time to drop the IP packet; and
transmitting the IP packet to a network node operating in the IP communication network.

2. The method according to claim 1, wherein the indication that is encapsulated in the network layer header comprises:
a first timestamp and the second maximum delay, wherein the first timestamp relates to a time when the IP packet will be transmitted by the source node.

3. The method according to claim 1, further comprising:
generating an absolute time based on a sum of a first timestamp and the second maximum delay, wherein the first timestamp relates to a time when the IP packet will be transmitted by the source node, wherein the time to drop the IP packet is determined based on the absolute time.

4. The method according to claim 1, further comprising:
receiving a notification from the network node when the IP packet is dropped;
counting the number of dropped IP packets based on the notification; and
notifying the application software installed on the source node to adjust a quality of data stream based on the number of dropped IP packets.

5. The method according to claim 1, wherein the indication is carried in an Option field of the network layer header.

6. The method according to claim 1, wherein the first maximum delay and the point in time to drop the IP packet are in submillisecond scale.

7. A source node for handling an Internet Protocol (IP) packet originating from the source node and addressing to a destination node in an IP communication network, wherein the source node is configured to:
obtain, from an application software installed on the source node, a first maximum delay of the IP packet between the source node and the destination node;
determine a second maximum delay based on a difference between the first maximum delay and at least one of an amount of a delay that will be caused by performing encapsulation of a data payload with a network layer header of the IP packet by the source node and an amount of a delay that will be caused by performing decapsulation of the data payload with the network layer header of the IP packet by a destination node addressed by the IP packet;
determine a time to drop the IP packet based on the second maximum delay;
encapsulate, at a network layer of the source node, the data payload with the network layer header to generate the IP packet, wherein the network layer header comprises an indication of the time to drop the IP packet; and
transmit the IP packet to a network node operating in the IP communication network.

8. The source node according to claim 7, further configured to:
receive a notification from the network node when the IP packet is dropped;
count the number of dropped IP packets based on the notification; and
notify the application software installed on the source node to adjust a quality of data stream based on the number of dropped IP packets.

9. The source node according to claim 7, wherein the indication that is encapsulated in the network layer header comprises a first timestamp and the second maximum delay, wherein the first timestamp relates to a time when the IP packet will be transmitted by the source node.

10. The source node according to claim 7, further configured to:
generate an absolute time based on a sum of a first timestamp and the second maximum delay, wherein the first timestamp relates to a time when the IP packet will be transmitted by the source node, wherein the time to drop the IP packet is determined based on the absolute time.

* * * * *